May 20, 1941.  E. C. HORTON  2,243,036
ACCESSORY SYSTEM FOR MOTOR VEHICLES
Filed Aug. 19, 1939  2 Sheets—Sheet 1
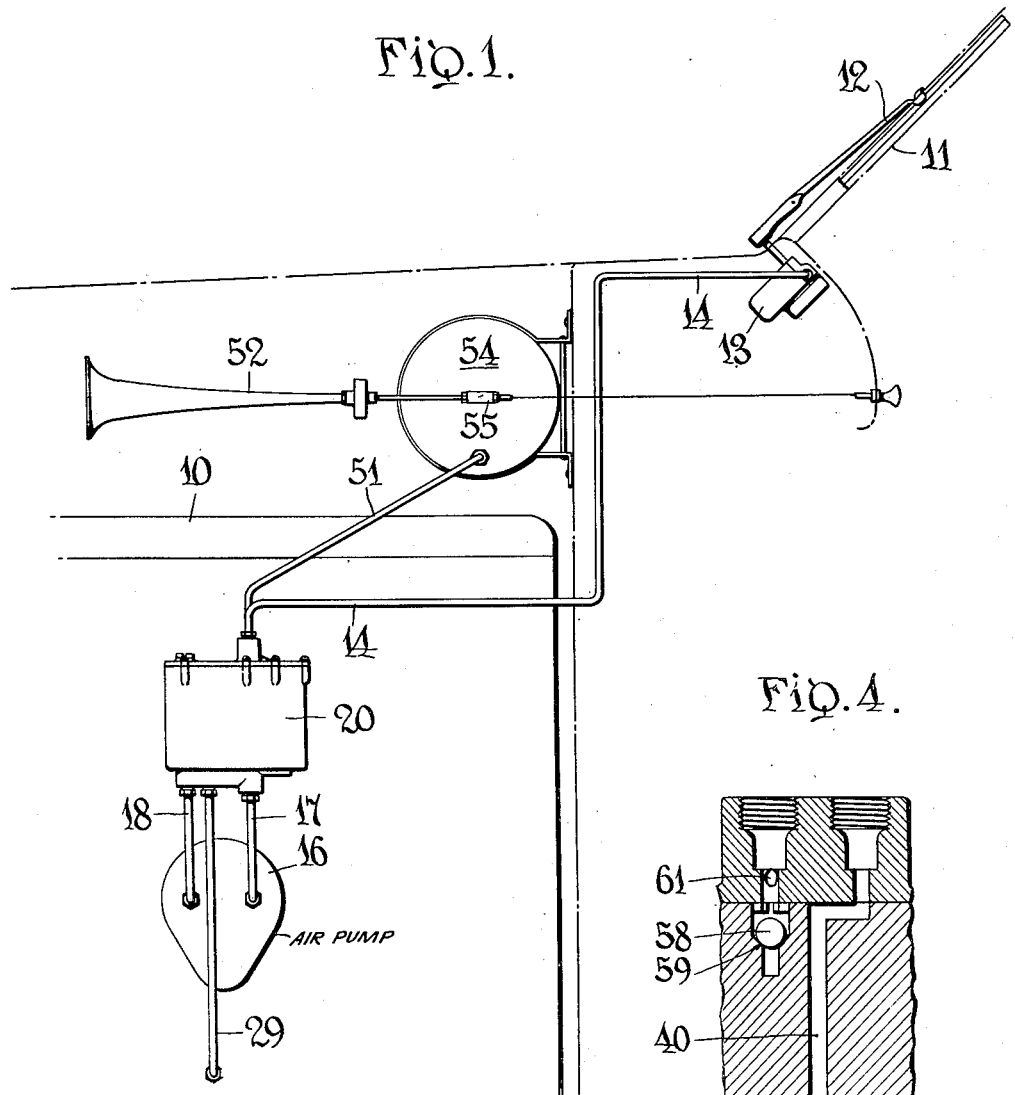
INVENTOR
Erwin C. Horton,
BY
Beau, Brooks, Buckley & Beau.
ATTORNEYS May 20, 1941.  E. C. HORTON  2,243,036
ACCESSORY SYSTEM FOR MOTOR VEHICLES
Filed Aug. 19, 1939  2 Sheets-Sheet 2
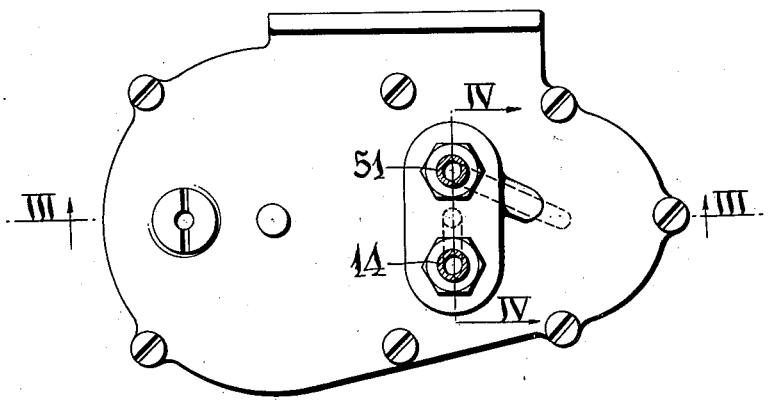
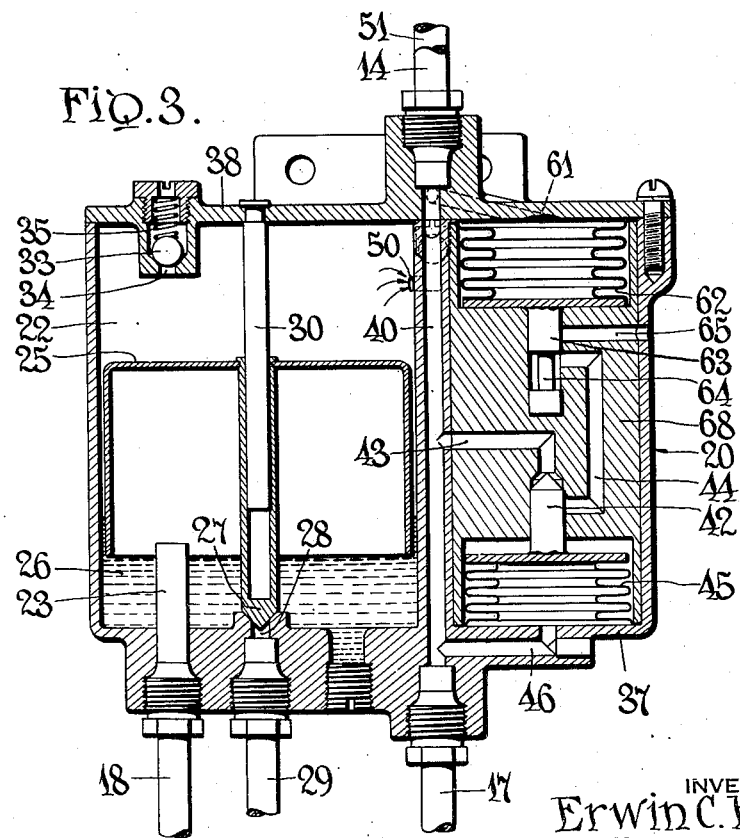
INVENTOR
Erwin C. Horton,
BY
Bean, Brooks, Buckley & Bean.
ATTORNEYS Patented May 20, 1941

2,243,036

UNITED STATES PATENT OFFICE 2,243,036

ACCESSORY SYSTEM FOR MOTOR VEHICLES

Erwin C. Horton, Hamburg, N. Y., assignor to Trico Products Corporation, Buffalo, N. Y.

Application August 19, 1939, Serial No. 291,054

8 Claims. (Cl. 60—57)

This invention relates to motor vehicle accessory systems and particularly to such systems employing fluid transmission media.

Air pressure differentials, both negative and positive with respect to atmospheric pressure, are frequently employed for actuation of accessories in connection with automotive vehicles. The widely used suction operated windshield cleaner may be taken as an example of an accessory operable by sub-atmospheric pressure and accessories employing superatmospheric pressure are numerous; horns, fuel pumps and brake boosters may be mentioned as examples.

In my present invention I provide a system whereby a sub-atmospheric pressure accessory and a super-atmospheric pressure accessory are adapted to be arranged in series with an interposed pump for transferring fluid from the former to the latter. I further provide, in such system, automatic control means whereby the sub-atmospheric or suction part of the system and the super-atmospheric or pressure part of the system are maintained independent to the extent that normal operation of neither of them is interfered with by reason of abnormalities or variations in the operation of the other.

Means are further provided, in my novel system, which permit the use of a fluid displacement pump provided with an ample supply of sealing fluid, usually lubricating oil, without likelihood of the sealing fluid being constantly lost or working injury to the system. Other advantages resulting from the employment of my novel accessory system will appear from a perusal of the ensuing specification and the accompanying drawings.

While the accessories may both connect directly with the pump or the pressure control means, I preferably provide a reservoir for one of the accessories whereby a differential pressure may be built up and stored, thereby permitting use of either of the accessories more or less independently of whether the other is in use or desired to be in use at the same time.

In the drawings:

Fig. 1 is a general side elevational view of the apparatus of my invention shown applied to an automotive vehicle having an engine and a windshield;

Fig. 2 is a plan view of the pressure control element of my invention;

Fig. 3 is a conventional cross sectional view taken approximately on the line III—III of Fig. 2; and Fig. 4 is a fragmentary cross sectional view taken on the line IV—IV of Fig. 2.

In the drawings like characters of reference denote like parts throughout the several figures and the numeral 10 designates generally the internal combustion propelling engine of an automotive vehicle which also has a windshield 11. Adjacent the windshield there is provided a windshield cleaning mechanism comprising a reciprocable wiping arm 12 and an actuating motor 13 therefor. The actuating motor, in the present instance, is adapted to be activated by the application thereto of sub-atmospheric pressure by means of a conduit 14 and is of conventional and well-known construction.

Stated in a general way, the apparatus of the present invention involves the use of an air displacing pump, indicated at 16 in Fig. 1 of the drawings, and the pump is so arranged that its intake conduit, designated 17, is connected to the windshield cleaner motor while its exhaust conduit, designated 18, communicates with a pressure storage tank and also, if desired, directly with one or more accessories operable by the application of super-atmospheric pressure.

Both the intake and the exhaust conduits, 17 and 18, in their extent to the windshield cleaner motor and the storage tank respectively, connect with a casing 20 which houses means for controlling the degree of pressure in both the sub-atmospheric and the super-atmospheric sides of the system. The pump itself may conveniently be driven from a moving part of the vehicle engine 10 and in pumps of the character under consideration it is desirable to provide a liquid seal for the pumping parts.

The sealing liquid may be ordinary lubricating oil and in this case a small part of the lubricating oil of the engine 10 may be caused to be entrained with the air as it is drawn into the pump. When this is the case the entrained lubricant, or the major portion of it, will eventually be delivered with the output air flowing through the conduit 18 and for this reason means are provided in association with the casing 20 of the controlling means for separating the output air and the entrained lubricant and returning the latter to the lubricant reservoir of the engine for re-use.

Such means include a chamber 22 into which the output air issuing from the pump 16 through the exhaust conduit 18 is delivered through a nipple 23 which extends upwardly into the chamber 22 as appears in Fig. 3. The oil which enters the chamber 22 with the output air of the pump is usually in a foamy condition owing to the velocity of the air through the pump and in the conduit 18. After it is delivered into the chamber 22 under the inverted cup shaped member 25 the foam condenses and collects at the bottom of the chamber as indicated at 26 in Fig. 3.

The cup shaped member 25 is arranged to serve as a float control for a valve 27 which seats over a port 28. The port 28 leads to a conduit 29 which in turn leads to the source of the lubricant supply, as for instance the crank case of the motor vehicle engine, or it may optionally lead to some point where it is directly available for re-use in sealing the pump 16.

The cup shaped member 25 and the valve 27 are relatively rigidly secured and an axial opening in the valve 27 receives a rigidly mounted depending pin 30 for vertically guided movement of the cup shaped member and the valve. When separated lubricant in the bottom of the chamber 22 reaches a predetermined level the valve leaves its seat over the port 28 and the separated lubricant flows out through the conduit 29 until the lubricant in the chamber 22 reaches such level that the valve 27 is reseated by downward movement of the float or cup shaped member 25.

To prevent the generation of excessive pressure in the chamber 22 and in the pressure side of the system generally a relief valve is provided and comprises a ball valve 33 which is normally held in seated position over a port 34 by means of a spring 35. When the pressure in the casing 22 exceeds the load of the spring 35 the valve 33 will obviously unseat and permit the escape of air until the pressure in the chamber 22 falls to a point within the proper and desired maximum.

Adjacent the chamber 22 the casing 20 has a portion 37 which is formed to receive suitable pressure responsive means for controlling both the degree of suction and the degree of pressure which are effectively generated by the pump 16 and the portion 37 of the casing 20 as well as the chamber 22 are closed by a common cover member 38.

A passage 40 extends through the casing 20 adjacent the portion 37 and connects at one end with the conduit 14 leading from the windshield cleaner motor 13 and at its other end with conduit 17 which leads to the intake side of the pump 16. In the normal condition of operation flow of air from the windshield cleaner motor to the pump 16 is directly through the conduit 14, the passage 40 and the conduit 17.

When, however, the degree of evacuation in the passage 40 exceeds a predetermined maximum, usually by reason of stoppage of the motor 13, a valve 42 is caused to become unseated and thereby connect passages 43 and 44, the former of which leads from the normal suction passage 40. This is brought about by a pressure responsive element which in the preferred embodiment comprises a resilient bellows 45, the interior of which has communication with the passage 40 by means of a passage 46.

The bellows 45 contracts in response to evacuation of its interior and when sufficient contraction has taken place the valve 42 moves downwardly, as seen in Fig. 3, a distance sufficient to establish communication between the passages 43 and 44. The manner in which the connection of these two passages cooperates in the combination to effect the operation of the system will presently appear.

Normal discharge of air under pressure from the chamber 22, after the lubricating oil has been separated therefrom, is through a passage 50, reference being had in this connection to Figs. 3 and 4. The passage 50 terminates in a conduit 51 which ultimately conducts the air under pressure to an air operated accessory, as for instance the horn 52, with or without an associated pressure storage tank 54.

In the illustrated form the storage tank is interposed in the conduit 51 between the point of discharge from the control means and the accessory and suitable manual valve or other means are provided for controlling the condition of operation or idleness of the accessory as at 55 in Fig. 1. To prevent retrograde flow in the conduit 51 a check valve is provided in the passage 50, see Fig. 4, wherein a ball 58 is held against a valve seat 59 when there is a preponderance of pressure at the upper side thereof and is unseated by a preponderance of pressure from beneath.

A by-passage 61 is formed in the cover member 38 leading from the passage 50 and establishes constant communication between the passage 50 and a second resilient pressure responsive bellows 62. The bellows 62 carries a valve 63 having a necked out portion 64 which in the upper position of the valve (opposite to that illustrated) serves to connect the passage 44, previously referred to, with the atmosphere by way of a passage 65.

It has previously been stated that tendency to raise the degree of evacuation in the passage 40 beyond predetermined limits results in opening movement of the valve 42 to connect the branch passages 43 and 44. This movement in and of itself has no direct effect on the operation of the system but the existence of an unusually high degree of evacuation in the low pressure side of the system normally results in a reduction in the output pressure due to the rarefaction of the air on the lower pressure side and to the greater amount of work necessary to be expanded against such reduced pressure.

Therefore an increase in the degree of evacuation in the passage 40 will normally be accompanied by such decrease of fluid pressure in the passage 50 and the by-passage 61 as to cause the resilient bellows 62 to contract from its illustrated position in Fig. 3 to an extent sufficient to move the valve 63 to a position for connecting the branch passage 44 with the atmospheric passage 65. When this takes place the passage 40 is vented to the atmosphere through the passages 43, 44 and 65, permitting the pump 16 to operate freely in delivering fluid under pressure to the super-atmospheric side of the system.

This condition will obtain until conditions in either the vacuum or pressure side of the system are such that one of the bellows 45 or 62 expands and closes its associated valve 42 or 63, whereupon what may be described as normal or full operation of the system is resumed.

If desired the valve 42 and its controlling means may be eliminated. This would seem to make the continuous operation of the suction accessory secondary to the maintenance of a predetermined degree of fluid pressure in the storage tank or at the fluid pressure operated accessory as the case may be. As a practical matter, however, and under normal conditions, about the only time the output pressure will drop below the prescribed minimum is when the suction accessory is shut off, during which time there may be insufficient air to supply the pressure actuated accessories.

For facility of manufacture the casing portion 37 which houses the pressure responsive means is formed with an opening which snugly receives a block 68 whose opposite ends are formed to receive the bellows 45 and 62, the various passages 43, 44 and 65 being formed in the intermediate portion of the block 68. The block 68 is held in place in the casing 20 by means of the cover member 38.

While a single specific embodiment of the invention has been illustrated and described it is apparent that many modifications may be made without departing from the spirit and scope of the invention as defined in the appended claims. In the foregoing description and in the appended claims it is to be understood that mention of the pump as being disposed "between" the suction accessory and the pressure accessory, and like expressions, are used in their practical sense, that is, as meaning, tacitly, with respect to the direction of fluid flow, and not necessarily actually physically between the accessories.

I claim:

1. In a motor vehicle accessory system, a suction operated accessory, a fluid pressure operated accessory, and a pump therebetween for transmitting fluid from the former to the latter, an atmospheric vent interposed between said suction operated accessory and said pump, valve means for normally preventing communication of said vent with the atmosphere, and pressure responsive means adapted to open said valve means when the pressure being delivered by said pump to said pressure operated accessory falls below a predetermined point.

2. In a motor vehicle accessory system, a suction operated accessory, a fluid pressure operated accessory, a pump having an intake port and an exhaust port, a conduit connecting the intake port with the suction operated accessory and a conduit connecting the exhaust port with the pressure operated accessory, a passage adapted to connect said first conduit with the atmosphere, a valve in said passage for effecting closure thereof, and means acting between said second conduit and said valve for opening the latter when pressure in said second conduit falls below a predetermined minimum.

3. In a motor vehicle accessory system, a fluid pump having an intake and an exhaust port, unitary pressure control means having connection with both of said ports, suction and pressure passages therein having connection with said intake and exhaust ports respectively, the opposite ends of said passages being connectible respectively with sub-atmospheric and super-atmospheric pressure operable accessories, a passage extending between said suction passage and the atmosphere, and a pair of valves normally closing said passage, pressure responsive means associated with said suction passage for controlling one of said valves, and pressure responsive means associated with said pressure passage for controlling the other of said valves.

4. In a motor vehicle accessory system, a suction operated accessory, a fluid pressure operated accessory, and a pump therebetween for transmitting fluid from the former to the latter, an atmospheric vent interposed between said suction operated accessory and said pump, and valve means for controlling communication of said vent with the atmosphere, said valve means being adapted to establish communication of said vent with the atmosphere when the suction exceeds a predetermined degree and the pressure falls below a predetermined minimum.

5. In a motor vehicle accessory system, a suction operated accessory, a fluid pressure operated accessory, a pump having an intake port and an exhaust port, a conduit connecting the intake port with the suction operated accessory and a conduit connecting the exhaust port with the pressure operated accessory, a passage adapted to connect said first conduit with the atmosphere, a pair of valves in said passage for independently effecting closure thereof, means acting between said first conduit and one of said valves for opening the latter when suction in the first conduit exceeds a predetermined degree, and means acting between the second conduit and the other of said valves for opening the latter when the pressure in said second conduit falls below a predetermined minimum.

6. In a motor vehicle accessory system, a suction operated accessory, a pressure operated accessory, and a pump therebetween and connected to the respective accessories, means responsive to an abnormally high suction as when the suction accessory is inoperative for admitting fluid to the suction side of said pump, and means responsive to the pressure output of the pump for regulating the admission of fluid by the first means in accordance with the requirement to maintain a normal pressure head for the pressure operated accessory, said first means acting to prevent fluid admission when the suction is not abnormally high as when the suction accessory is operative.

7. In a motor vehicle accessory system, a suction operated accessory, a fluid pressure operated accessory, and a pump therebetween for transmitting fluid from the former to the latter, a valved atmospheric vent interposed between said suction operated accessory and said pump, means maintaining said valved vent closed at all times excepting when prevailing suction exceeds the degree required for satisfactory operation of said suction operated accessory, and other means maintaining said valved vent closed when pressure at the pressure side of said pump exceeds a predetermined minimum.

8. For use in a motor vehicle accessory system having a suction operated accessory, a pressure operated accessory, and a pump for moving operating fluid from the former to the latter; a unitary pressure control element having a pair of passages therein, one of said passages being connectible at its opposite ends to the suction operated accessory and the inlet side of the pump respectively, the other of said passages being connectible at its opposite ends to the pressure operated accessory and the outlet side of said pump respectively, said control element comprising means responsive to an abnormally high suction as when the suction accessory is inoperative for admitting fluid to the suction side of said pump, and means responsive to the pressure output of the pump for regulating the admission of fluid by the first means in accordance with the requirement to maintain a normal pressure head for the pressure operated accessory, said first means acting to prevent fluid admission when the suction is not abnormally high as when the suction accessory is operative.

ERWIN C. HORTON.